UNITED STATES PATENT OFFICE.

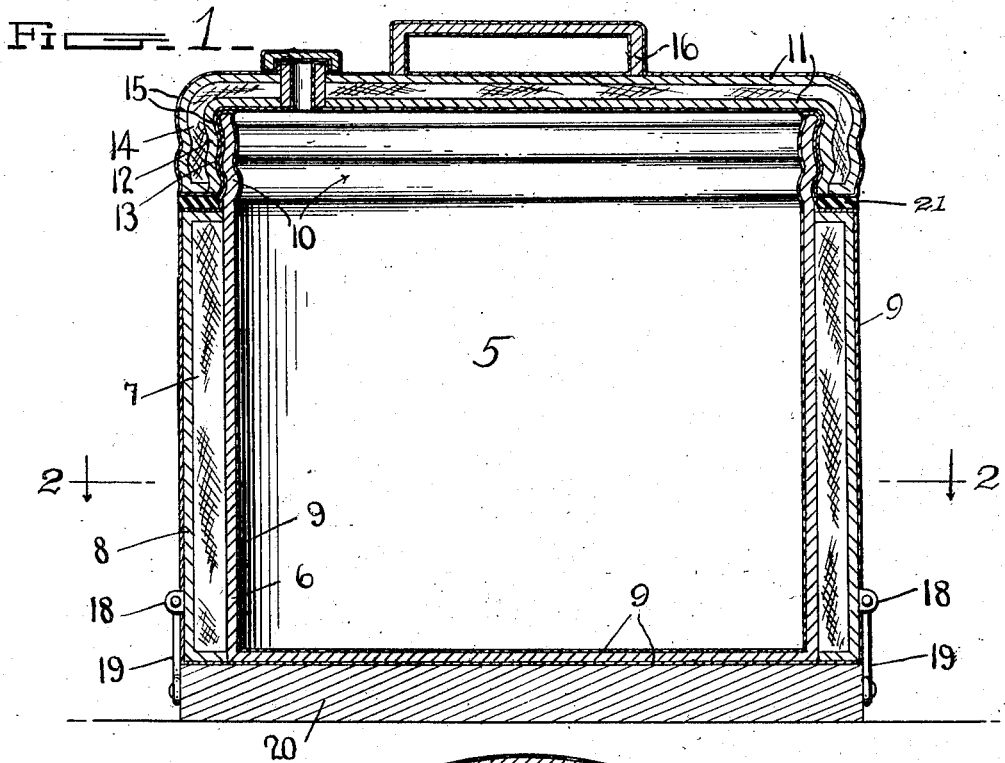
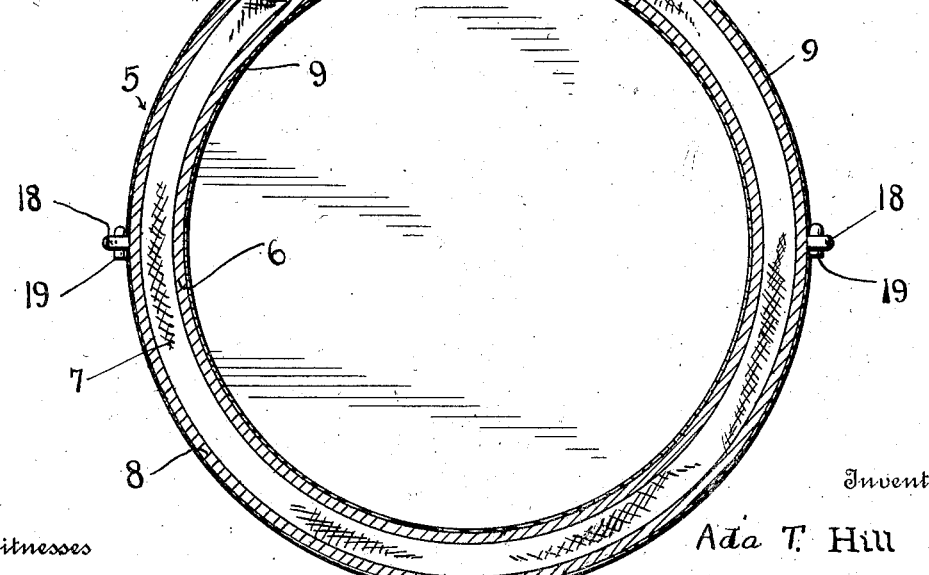

ADA T. HILL, OF SALEM, ILLINOIS.

FIRELESS COOKER.

1,005,211.  Specification of Letters Patent.  Patented Oct. 10, 1911.

Application filed May 31, 1910. Serial No. 564,230.

*To all whom it may concern:*

Be it known that I, ADA T. HILL, a citizen of the United States, residing at Salem, in the county of Marion, State of Illinois, have invented certain new and useful Improvements in Fireless Cookers; and I do hereby declare the following to be a full, clear, and exact description of the invention, such as will enable others skilled in the art to which it appertains to make and use the same.

The invention relates to a cooking utensil and more particularly to the class of fireless cookers.

One of the objects of the invention is the provision of a device of this character in which the receptacle is provided with a detachable heat retaining bottom so that the receptacle may be utilized in the ordinary manner for cooking victuals upon a stove when the bottom has been detached and thereafter the said receptacle may be utilized as a heat retainer to preserve the contents at substantially the temperature when the receptacle was removed from the stove and which temperature may be maintained for a considerable period of time so as to maintain the food heated or to cause the cooking thereof after having been removed from the stove.

With the above and other objects in view the invention consists in the construction, combination and arrangement of parts as will be hereinafter more fully described, illustrated in the accompanying drawings, disclosing the preferred forms of embodiment of the invention and pointed out in the claims hereunto appended.

In the drawings:—Figure 1 is a vertical longitudinal sectional view thereof. Fig. 2 is a transverse sectional view on the line 2—2 of Fig. 1.

Similar reference characters indicate corresponding parts throughout the several views in the drawings.

Referring to the drawings by numerals 5 designates generally a vessel the body of which comprises a bottom, and an inner and outer vertical wall formed from sheet iron 6 and against the outer face of the inner vertical wall of the vessel is disposed a sheet of asbestos 7. Surrounding this sheet of asbestos 7 is an outer layer of sheet iron 8 while on the outer face of the latter and the inner face of the inner side wall and the inner and outer faces of the bottom of the vessel is arranged a coating of granite 9 that covers the said faces of the vessel and also extends over the upper edge of the side wall of the vessel. The upper mouth edge of the inner wall of the vessel 5 is corrugated to form screw threads 10 and the outer layer of sheet iron 8 is turned inwardly over the upper edge of the asbestos 7 which terminates immediately below the corrugated upper end portion of the inner wall of the vessel so that the extended portion of sheet iron 8 will cover the outer surface and upper edge of said asbestos 7 surrounding the said inner wall of the vessel. A cover is removably fitted on the upper end of the vessel, consisting of an inner and outer wall 11 of sheet iron and an intermediate layer of asbestos 14. The cover 11 is formed with an annular flange 12 which is provided with screw threads 13 for engagement with the screw threads 10 of the vessel. The inner and outer surfaces of the cover are coated with granite 15. The outer wall 11 has a handle 16 secured thereto.

Extending outwardly from the outer face of the vessel at diametrically opposite points thereof spaced from its bottom are eyes 18 the same adapted to be detachably engaged by pivotal hook members 19 suitably mounted at diametrically opposite points of a detachable soapstone bottom 20 of disk shape, the said detachable bottom being adapted to be attached to the vessel after the same has been removed from a stove on the contents being heated to a predetermined temperature. The lower ends of the side walls of the vessel are flush with the rigid bottom, so that when the soapstone bottom 20 is removed from the lower ends of the side walls the said side walls will engage wtih the heating stove and the side walls and the heat retaining material between the same will be heated.

Resting upon the inturned upper edge of the sheet iron 8 is a rubber gasket 21 so that when the lid is screwed on the vessel there will be an air tight juncture between the same.

What is claimed is:—

1. In a fireless cooker, a vessel having a rigid bottom and side walls and heat retaining material between said walls, the bottom and the side walls being adapted to lie flush on a heating stove and a removable bottom for the vessel adapted to contact with the rigid bottom and the lower ends of the side walls.

2. In a fireless cooker, a vessel having an inner and outer wall and asbestos disposed between said walls, the inner wall being extended above the outer wall and being formed with screw threads, a bottom integral with the inner wall and lying flush with the lower edge of said outer wall, a cover adapted to engage the screw threads of the inner wall and a soapstone bottom removably secured to the outer wall against the bottom of the inner wall and snugly contacting with said bottom and with the lower end of said outer wall.

In testimony whereof, I affix my signature, in presence of two witnesses.

ADA T. HILL.

Witnesses:
P. T. KENNEDY,
GEO. W. SMITH.